Oct. 23, 1962 — C. W. COCHRAN — 3,059,739
MOLDING FASTENER INSTALLATION
Filed Dec. 23, 1959
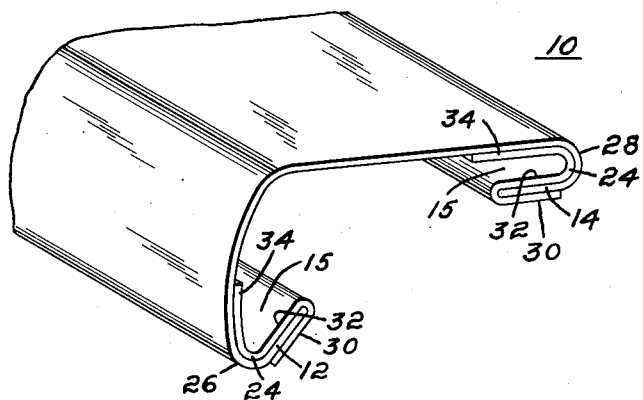
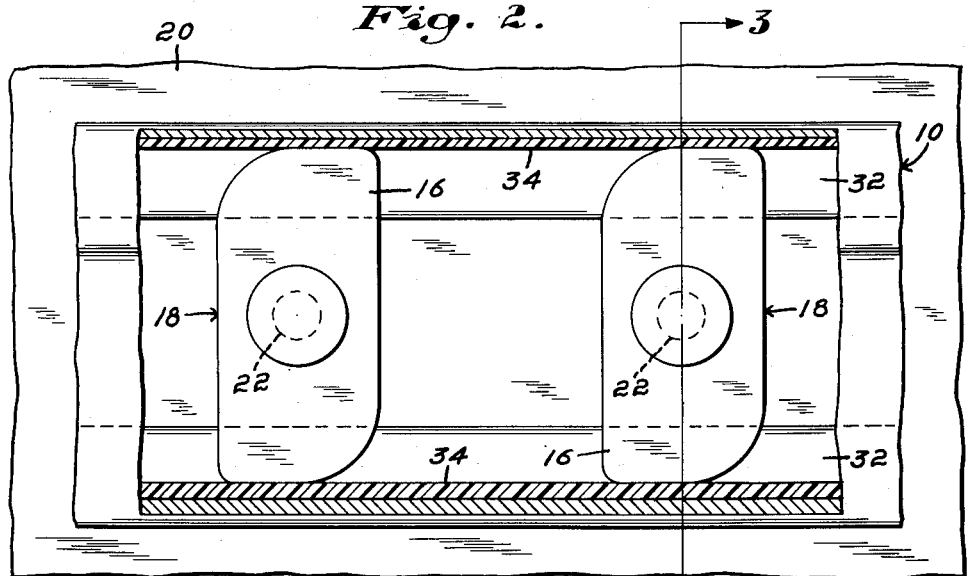
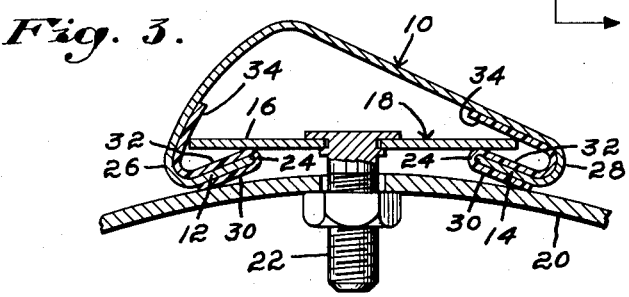
Inventor:
Clarence W. Cochran,
by James B. Tiffany Jr.
Atty.

3,059,739
MOLDING FASTENER INSTALLATION
Clarence W. Cochran, Belmont, Mass., assignor to United-Carr Fastener Corporation, Cambridge, Mass., a corporation of Delaware
Filed Dec. 23, 1959, Ser. No. 861,607
2 Claims. (Cl. 189—88)

This invention relates to molding installations and in particular to a non-metallic molding insulation adapted to eliminate electrolytic corrosion.

In the construction and assembly of automobiles, a large variety of different metals are used in the components parts. Serious difficulties have been encountered with corrosion due to the electrolytic action developed by contact between these different metals. For example, in a molding assembly, the fastener plate is formed of carbon steel or other metals. The molding itself is of aluminum or stainless steel and the automobile body of cold-rolled steel. Therefore, due to weather conditions, the corrosion due to these various metals cause corrosion to the fastener and body at a plurality of points on the body surface.

The object of the invention is to provide a non-metallic insulation to prevent contact between the dissimilar metallic parts and reduce the electrolytic action.

A further object of the invention is to provide a non-metallic insulator which can be economically extruded and which will act as a sealer between the molding flange and the auto body to prevent the ingress of water.

Another object of the invention is to provide a non-metallic insulator between the molding, the auto body and the fastener which will protect the body part.

Other objects of the invention will, in part, be obvious, and will, in part, appear hereinafter.

In the drawings:
FIG. 1 is a view in perspective of a molding with the insulation assembled therewith;
FIG. 2 is a top plan view, partly in section of a molding fastened to the body with the insulation in assembly; and
FIG. 3 is a view in section taken on line 3—3 of FIG. 2.

Referring to the drawings, there is illustrated a conventional molding 10, with the distal ends 12 and 14 curved back toward each other forming a recess 15, and adapted for cooperative engagement with a flange 16 of a fastener 18 which is secured to the automobile body 20 by means of a threaded shank 22.

My invention comprises a non-metallic insulator 24 formed of a non-conductive semi-rigid plastic, such as nylon or the like, which may be simply and economically extruded so as to have a configuration similar to the ends of the molding 12 and 14. As illustrated in FIG. 3, extrusions of the insulator 24 are formed for each side 26 and 28 of the molding 10 and comprise a sinuous structure having a base 30 to encompass the outer surface of one end of the molding and a reversely bent portion 32 which is substantially parallel to but spaced from the base 30, and an extension 34 curving upwardly and abutting the inner surface of the molding for a predetermined distance.

The assembly of the insulator 24 with the molding 10 is made by fitting the two surfaces together and due to the semi-rigid characteristics of the material involved, the insulator will encompass the distal ends 12 and 14 of the molding.

As will be obvious by FIG. 3, the molding 10 is prevented from contacting the body 20 by the base 30 of the insulator, and the flange 16 of the fastener 18 is separated from the molding by the extension 34 so that the possibilities of electrolytic action have been removed. Furthermore, as shown in FIG. 3, the edges of the molding 12 and 14 are held away from the body 20 by the insulator 24 so that scratching of the body surface is reduced to a minimum and an effective seal prevents the ingress of water into the interior of the molding.

Since certain other obvious modifications may be made in this device without departing from the scope of the invention, it is intended that all matter contained herein be interpreted in an illustrative and not in a limiting sense.

I claim:
1. A molding assembly comprising, in combination, a hollow longitudinally extending molding of corrosive material having spaced inturned longitudinal flanges, a non-metallic insulation applied within said hollow molding and extending longitudinally relative thereto in the direction of the inturned flanges to cover internal surfaces of said flanges and a fastener member having a flange of corrosive material bridging said spaced inturned flanges anywhere along the length of said molding and insulated from said molding by said insulation, and said non-metallic insulation also extending around said inturned flanges and on undersurfaces thereof to insulate said hollow molding from a corrosive metallic support for the molding.

2. A molding assembly comprising, in combination, a hollow longitudinally extending molding, a support for the molding and a flanged fastener holding the molding to the support, at least two of said molding, support and fastener being of dissimilar metals that would cause corrosion when in contact under corrosion causing circumstances and non-corrosive material interposed between the flange of the fastener at an edge and at least one face thereof and the inner surface of the hollow molding and providing for insulation of the fastener flange from the molding anywhere along the length of the molding.

References Cited in the file of this patent
UNITED STATES PATENTS

| | | |
|---|---|---|
| 2,740,000 | Wierk | Mar. 27, 1956 |
| 2,745,156 | Bedford | May 15, 1956 |